United States Patent
Sheekookian

(10) Patent No.: US 6,971,120 B1
(45) Date of Patent: Nov. 29, 2005

(54) METHOD AND APPARATUS FOR PROVIDING CONSUMER-CHOSEN TELEPHONE SERVICES ON A DIGITAL CABLE TV SET-TOP BOX

(75) Inventor: Raffi Sheekookian, Tinton Falls, NJ (US)

(73) Assignee: A.T.&T. Corp., New York, NY (US)

( * ) Notice: Subject to any disclaimer, the term of this patent is extended or adjusted under 35 U.S.C. 154(b) by 959 days.

(21) Appl. No.: 09/782,096

(22) Filed: Feb. 13, 2001

(51) Int. Cl.$^7$ ............................................. H04N 7/173
(52) U.S. Cl. ...................................... 725/106; 725/110
(58) Field of Search ............................... 725/106, 109, 725/110, 131, 139, 151; 348/14.04; 379/102.03

(56) References Cited

U.S. PATENT DOCUMENTS

| | | | |
|---|---|---|---|
| 5,917,892 A | * | 6/1999 | Lee .......................... 379/88.12 |
| 6,209,025 B1 | * | 3/2001 | Bellamy ...................... 709/217 |
| 6,215,515 B1 | * | 4/2001 | Voois et al. .............. 348/14.01 |
| 6,457,177 B1 | * | 9/2002 | Reams ........................ 725/106 |
| 2002/0075231 A1 | * | 6/2002 | Martino et al. ............. 345/158 |

* cited by examiner

Primary Examiner—Vivek Srivastava

(57) ABSTRACT

A method and system of downloading a set of programs, navigational, branding and other data to a consumer's set-top box coupled to a cable TV headend controller. The set-top box is also coupled to the PSTN via the headend controller. A user navigates a series of menus displayed on a display device coupled to the set-top box and makes selections of a desired telephone service and enters any pertinent data. When the user makes a telephone call, the set-top box translates any dialed digits to a POTS number and completes the call. Other services, such as ANI-based services, can also be provided in the set-top box in a similar way. Further, these service selections made by the user are written to a portable storage medium that is removably coupled to the set-top box, thereby enabling the user to transport the data to another set-top box.

4 Claims, 4 Drawing Sheets

METHOD AND APPARATUS FOR PROVIDING CONSUMER-CHOSEN TELEPHONE SERVICES ON A DIGITAL CABLE TV SET-TOP BOX

TECHNICAL FIELD

The present invention is related in general to the design of a digital set-top-box used to connect cable TV systems to televisions and, in particular, to a method and apparatus to deliver consumer-chosen telecommunication services using an integrated cable TV set-top-box that interfaces with the Public Switched Telephone Network (PSTN).

BACKGROUND

Set-top boxes (STB) are commonly used to connect televisions to cable systems. Because the way consumers are using everyday appliances such as television is changing, cable companies have been trying to deliver additional services-such as online shopping, weather forecasts, and advertising over existing cable connections. These new services typically include interfacing with public data communications networks such as the Internet. While a traditional cable-only STB was simple in design, delivery of such new services requires more sophisticated STBs.

Hardware suppliers such as IBM have developed integrated chip designs that provide many components of a digital STB on a single chip. Such integrated chip designs are an example of a new trend called "pervasive computing," whereby computing power as well as Internet access is designed into a wide range of business and consumer devices.

While integration of cable television systems with the Internet has been progressing, there has arisen another need to harmonize these systems with the Public Switched Telephone Network. In particular, the acquisition of cable TV service providers such as Tele-Communications, Inc. by traditional telecommunications services providers such as AT&T has identified a need to integrate the existing PSTN infrastructure with the cable TV systems so as to deliver television, telephone, and Internet access services from a single integrated STB, preferably in a cost-effective manner.

There is also a need for an STM that can provide several consumer choice-driven services such as those typically provided by an operating telephone company. Examples of such services include Automatic Number Identification (ANI)-based services such as personal dialing plans, dialing restrictions to area codes, local numbers, speed dial codes and others. Traditionally, these services have been offered by local and some long distance telephone companies as switch-based services. If these customer-chosen selections were stored and made use of on a customer premise equipment such as an STB, the customer would enjoy a more portable solution. Additionally, providing these services on an STB would enable competing carriers such as cable operators to provide such services without the need to access the incumbent carrier's switching databases and translations. Accordingly, there is a need for such a method and apparatus.

SUMMARY

In one aspect, the present invention is directed toward a digital cable TV set-top-box communicatively connected to a cable TV headend controller, which controller is in turn connected to the public switched telephone network (PSTN), the Internet and a cable TV broadcast source. After the set-top box identifies and synchronizes with a downstream channel, a service provider establishes a connection between the set-top box and the PSTN and downloads a plurality of programs and data, which comprise branding information, navigational data, advertisements and announcements. A user operates an input device communicatively coupled to the set-top box and navigates through a set of menus and selects or chooses types of telephone services to which he or she would like to subscribe. These selections and choices are stored in a storage medium removably coupled to the set-top box. When the user makes a telephone call using a telephone line connected to the set-top box, a computer program routes and completes the call based on the selections/mode.

A further advantage of the present invention comprises the portability of the storage medium, whereby the user can remove the storage medium or copy the data from the storage medium and use it at a second set-top box configured to read the data from the portable storage medium. This allows for a portability of the service selections made by the user.

BRIEF DESCRIPTION OF THE DRAWINGS

These and other objects, features and advantages of the present invention are more readily understood from the following detailed description of the preferred embodiments in conjunction with the accompanying drawings, where like numbers indicate like parts in the several views of the drawings, and wherein.

DETAILED DESCRIPTION OF THE PREFERRED EMBODIMENTS

Figure 1:
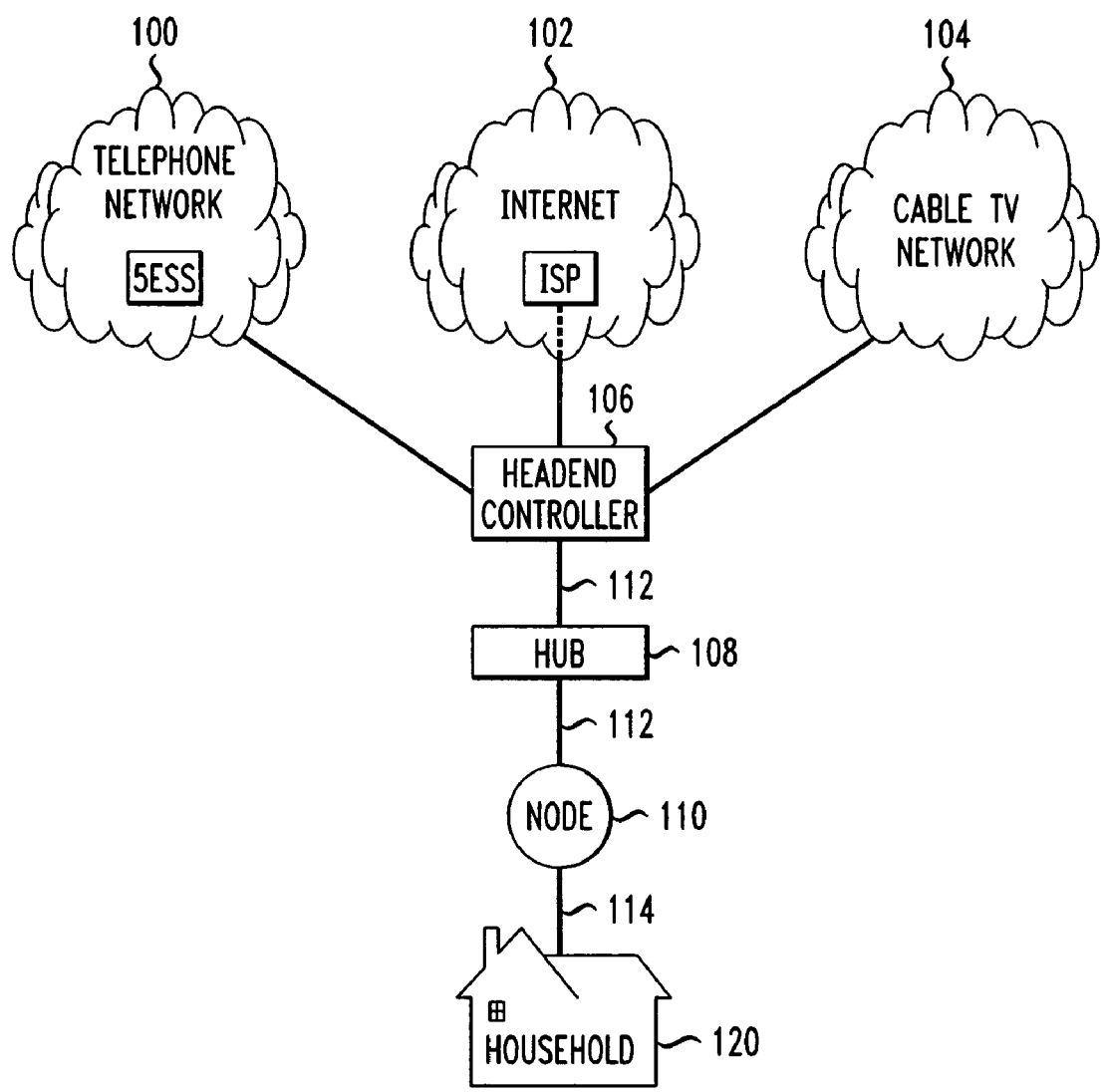
FIG. 1 depicts how a household communications network interfaces with several service provider entities in a preferred embodiment of the invention.

Referring to FIG. 1, a headend controller 106 is connected to the Public Switched Telephone Network (PSTN) 100, the Internet or other public data communication network 102 and a cable TV network 104 such as the Tele-Communications, Inc., network. Connection to the PSTN is typically through a switch such as the Lucent® 4ESS™ or a 5ESS™. Other examples of similar switching systems include the Nortel® DMS 100/200™ switching system, the Siemens® EWSD™ switching system, and comparable models marketed by other vendors such as Alcatel®. Connection to the Internet is typically through an Internet Service Provider (ISP). Though for the sake of simplicity only three disparate network types 100, 102, 104 are shown, it should be understood that the present invention by no means is limited to only these three network types. For example, there could be established a connection at the headend controller 106 to a Satellite communications network via a Radio Frequency channel.

The headend controller 106 forms the central distribution point for a cable TV (CATV) system. The headend controller 106 is also coupled to a node 110 via a hub 108. The transport connection 112 between the headend controller 106 and the node 110 is preferably a fiber-optic connection in a hybrid fiber-coax (HFC) configuration. In such a configuration, the node 110 is an optical node. In other embodiments, the connection 112 could be a regular coaxial cable connection (coax) as is the case with older CATV systems. The node 110 in turn is connected to a household communications network 120 via a coax 114.

Figure 2:
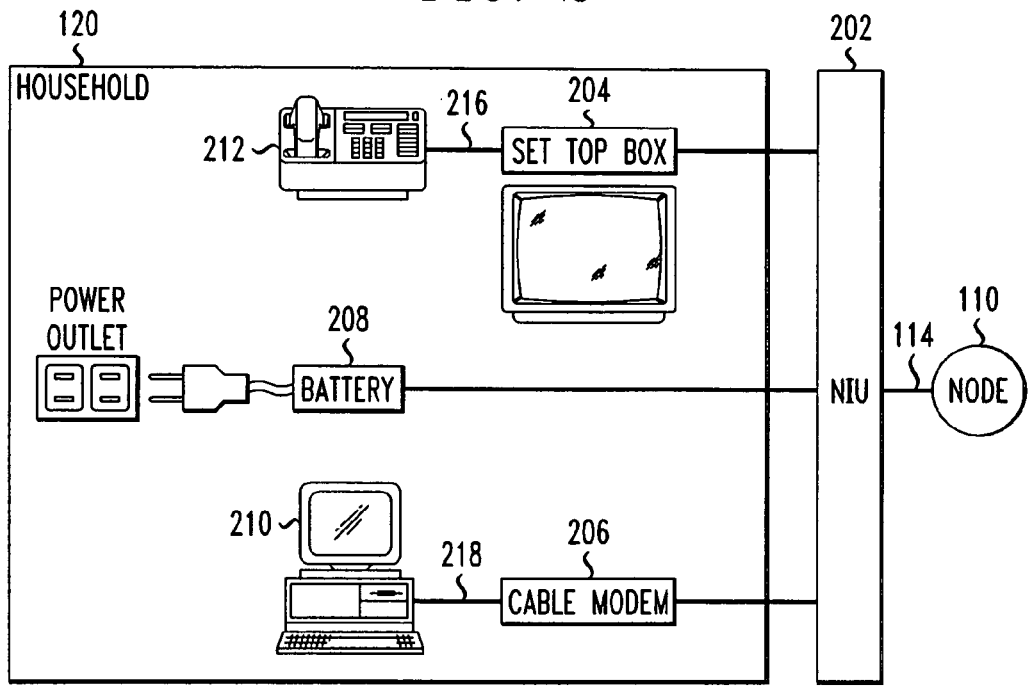
FIG. 2 depicts a preferred household communications network in which a digital set-top box interfaces with a cable modem and a telephone handset via a network interface unit.

Referring now to FIG. 2, in a preferred embodiment, household communications network 120 comprises a network interface unit (NI) 202 coupled to a set-top box (STB) 204, a cable modem 206 and a power supply source 208. The STB 204 is in turn coupled to a regular telephone handset 212, preferably by means of a twisted-pair of copper wires 216. The cable modem 206 is connected preferably via a 10-base-T or a 100-base-T connector 218 to a host 210, which could be any end-user computer system that connects to a network. In other embodiments, the host 210 may also include a computer system connected to a local area network (LAN) interface of the cable modem 206.

Figure 3:
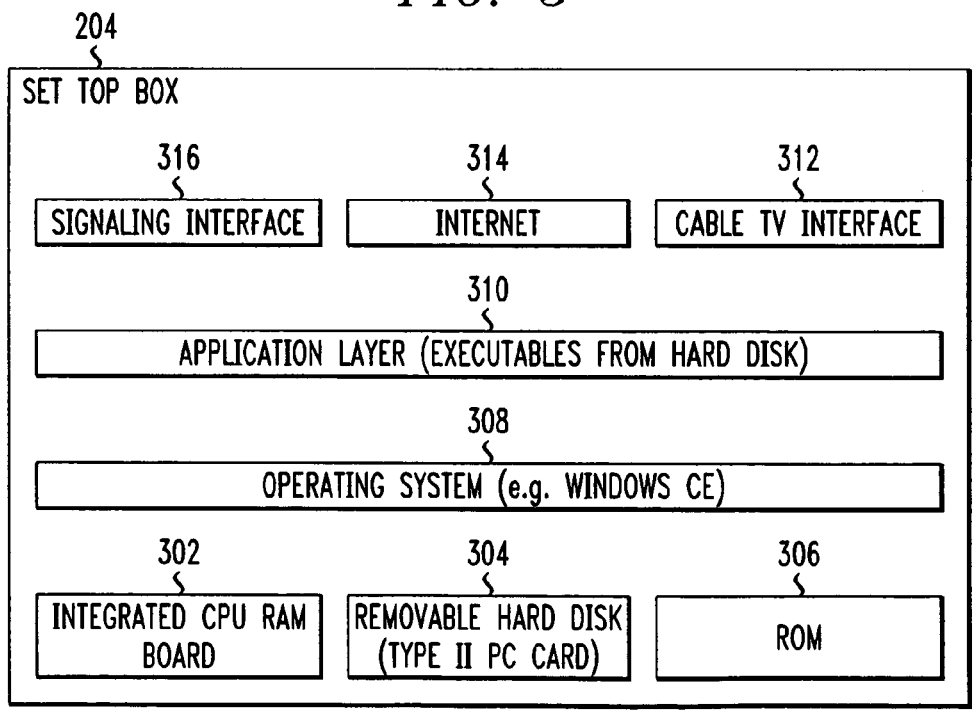
FIG. 3 is a preferred hardware/software architecture of the digital set-top box.

Referring to FIG. 3, STB 204 preferably comprises a controller board 302 such as the board marketed by IBM corporation as STB010x0™ family, which comprises a central processing unit such as the IBM PowerPC 401 ™ processor. Advantageously, STB controller board 302 additionally comprises a memory such as a semiconductor Random Access Memory (RAM), a cache memory, and connections to peripheral units on the same board. Other examples of controller board 302 include the DCT-2000T marketed by General Instruments and the Active™ 3875™ marketed by Acorn™. STB 204 additionally comprises an external (removable) hard disk drive 304 such as a Type II PCMCIA removable disk; and a Read Only Memory (ROM) 306 for storing the basic information required to operate the STB 204 in a minimum configuration. Further, STB 204 comprises an operating system 308 and an application layer 310, preferably with executable programs stored on the hard disk drive 304. Any one of a number of small, sophisticated operating systems that fall within the burgeoning category of "embedded applications" can be used. Examples of such operating systems include Windows CE, and Sony Corp.'s Aperios, the operating systems selected by Tele-Communications, Inc. as primary and alternate systems respectively; PowerTV™, the operating system chosen for Time Warner's Pegasus STB; Microware Systems Corp.'s OS-9; Sun Microsystems Inc.'s JavaOS for Consumers; Microware's OS-9-based Digital Audio/Video Interactive Decoder (DAVID) used by Motorola as the operating system for its Blackbird multimedia architecture; and the TiVo Corporation's (of Sunnyvale, Calif.) Linux-based set-top box operating system.

The preferred architecture of STB 204 further includes interface boards 312, 314, 316 for connections to the cable TV, the Internet and the PSTN via a signaling system no. 7 (SS7), respectively These interface boards are commercially available for certain brand-name digital STBs. Alternatively, they could be readily designed by a person skilled in the art without undue experimentation or effort.

In a preferred embodiment, STB 204 is coupled to a display device such as a television picture tube, a CRT or a flat-panel display. Additionally, a preferred embodiment includes at least one input device such as a keyboard, a pointing device such as a mouse, a television remote control or other infra-red input device coupled to STB 204. It should be noted that STB 204 is not a general purpose computing environment; instead, it is a conduit for services delivered by service providers.

OPERATION

Figure 4A:
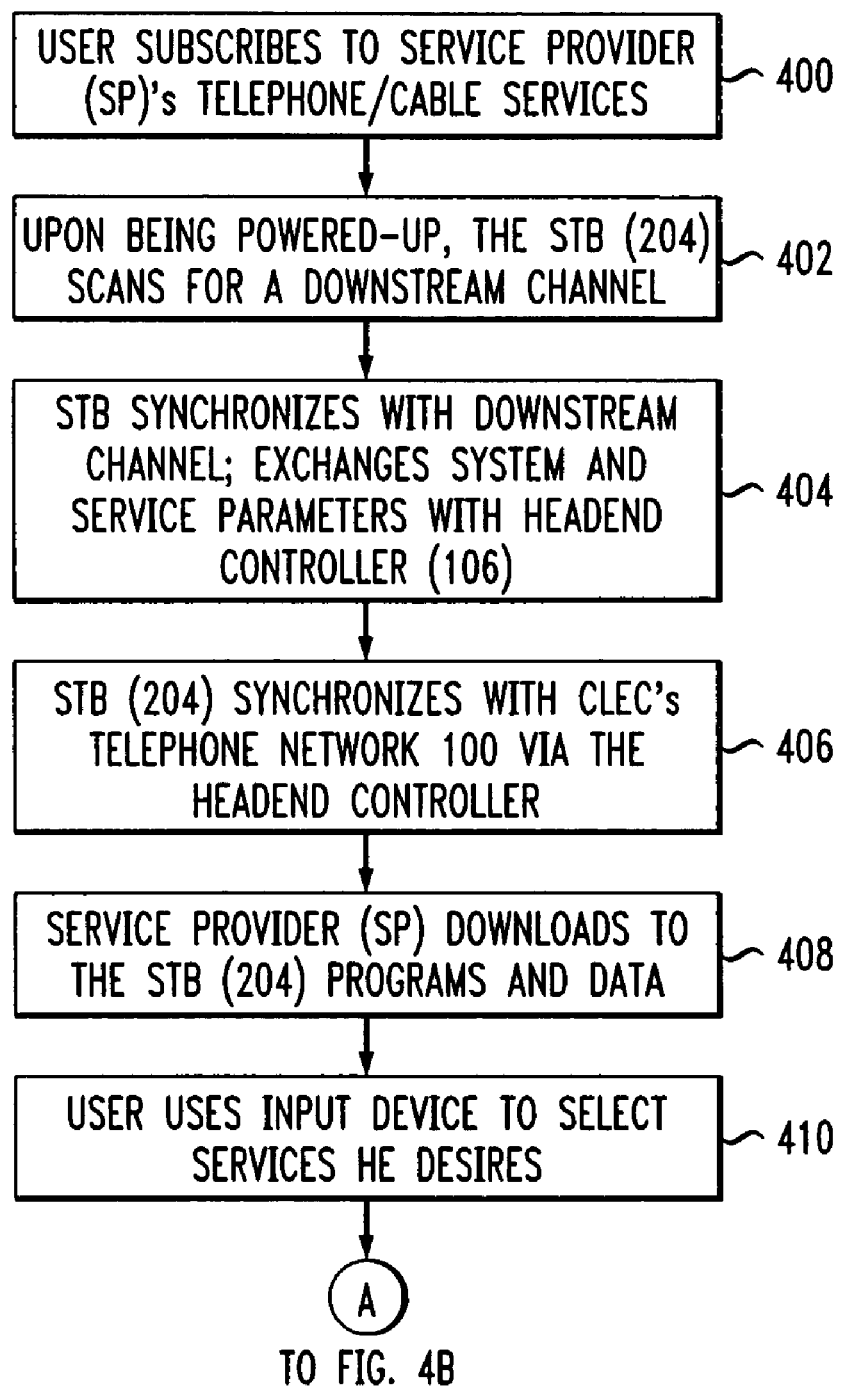
FIG. 4 is a flow-chart of the steps of a preferred embodiment of the invention.
Figure 4B:
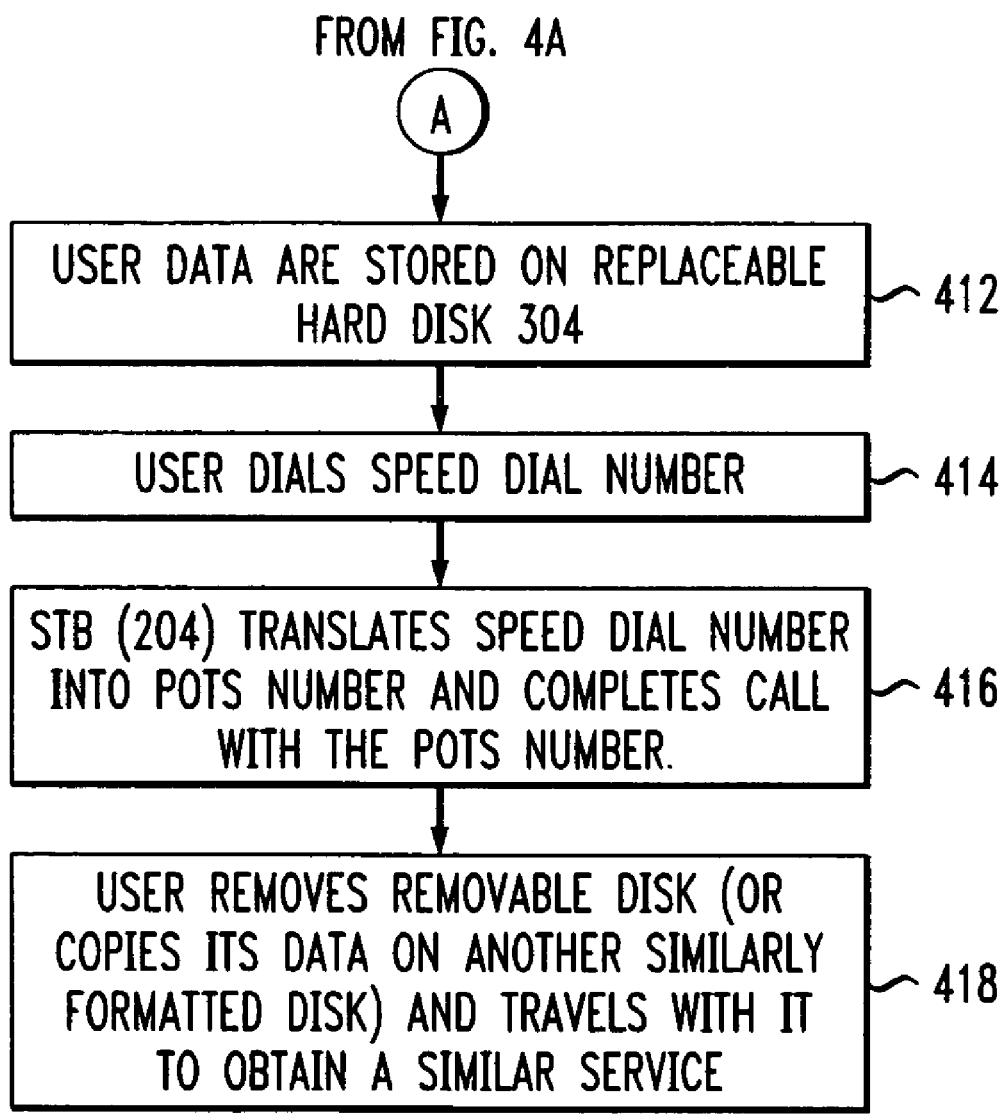

Referring to FIG. 4, a user of telephony services operates the integrated digital cable set-top-box of the present invention as follows. First, the user subscribes to the telephone and cable services provided by a telephone service provider (SP) such as a competing Local Exchange Carrier (CLEC) and cable services provider such as AT&T. Further the CLEC preferably provides telephone service using a cable TV connection, rather than via a twisted pair or an ISDN line (step 400). In other embodiments, the invented method could be practiced by a local service provider as a way to provide Customer Premise Equipment (CPE)-based services rather than or in addition to switch-based services. Thus, it should be noted that the nature of the SP's business model is not an important aspect of the inventive principles described herein.

When STB 204 is powered-up via the power source 208, it first scans for a downstream channel—which is a set of frequencies used to send and receive data between STB 204 and headend controller 106 (step 402). When the downstream channel is identified, it is synchronized with STB 204. System and service parameters and date/time information are then provided by headend controller 106 to STB 204 (step 404). At about the same time, PSTN signaling interface 316 also synchronizes with the SP's or another company's telephone network 100 via headend controller 106 (step 406).

The SP then downloads to STB 204 a set of programs and data. The programs and data comprise a number of branding, navigational and announcement services (step 408). The download may happen from a remotely located computer coupled to the headend controller 106 via the Internet 104 or via another device. The branding services include audio or visual indicators of a brand name product or service offered by the SP. The navigational services include a plurality of graphical or audio/visual user interfaces comprising a series of menus of offerings provided by the SP. Examples of these offerings preferably include services similar to Automatic Number Identification (ANI)-based services offered by a Local Exchange Company (LEC) or a company such as AT&T. The announcement services include a number of product or other announcements, including service-related announcements, billing information and the like. The downloaded programs allow a user to navigate, control and use the services provided by the SP, by way of the facilities provided by the user-interface devices such as menus.

A user can now use the keyboard or other input device to set up, subscribe to, edit, or remove subscription services offered by the SP (step 410). For example, the user may select a number of speed dial codes for his telephone handset 212. These codes are entered in STB 204 according to the following table 1.

TABLE 1

SPEED DIAL CODES

| Speed dial code | Dialed Telephone Number |
|---|---|
| 12 | 703-555-XXXX ("Home") |
| 13 | 202-555-YYYY ("work") |
| 22 | 301-555-ZZZZ ("friend") |

Other services that could be utilized by the user include restrictions on area codes, local numbers or international destinations, control of announcements played by long-distance telephone service providers, and the like. These data, once entered by the user, are stored on the removable hard disk 304 (step 412). Thus, one of the advantages of the present invention includes a method by which the user can customize his set-top box configuration, and can make such customization portable by writing the user-entered data to a portable medium such as the disk 304.

When the user wishes to make a telephone call, he typically lifts the handset 212 and STB 204 provides a dial tone. Suppose the user dials the speed dial number 22 (step 414). The STB 204 performs a lookup in its speed dial list and translates the number "22" to the POTS number 301-555-ZZZZ and completes a telephone call with the number 301-555-ZZZZ (step 416). If the user selects an area code or a country code that is in the prohibited list, the programs or menus downloaded to STB 204 determine that the call cannot be completed and announce a message stating that the selected destination is not reachable from that number. In alternative embodiments, a variety of complex call routing methods that are typically used by a LEC can be included in the STB 204.

Advantageously, the information stored on the removable hard disk can be used on other STB's 204. Thus, if the user travels to another location, the user can remove the removable hard disk 304 and take it with him to the other location. There, he can insert the removable hard disk into another STB 204 to obtain a service that is almost identical to his home service (step 418). Alternatively, the user makes a copy of the data stored in the removable hard disk 304 on another similarly formatted portable disk.

The foregoing describes a useful method and system for delivering user-chosen telecommunication services using an integrated digital cable TV set-top box that interfaces with the Public Switched Telephone Network (PSTN). Persons skilled in the art may make several modifications to the disclosed invention without substantially deviating from the spirit and scope of the invention. Accordingly, all such modifications should be construed to be within the scope of the appended claims.

What is claimed is:

1. A method of providing user-chosen telephone services through a digital cable TV set-top box, the digital cable TV set-top box coupled to a cable network headend with a service provider's telephone network also coupled to the cable network headend, the method comprising the steps of:
   scanning for an available downstream channel on the cable network by a set-top box;
   synchronizing with the available downstream channel by the set-top box;
   synchronizing, through the cable network headend and over the available downstream channel, with the service provider's telephone network by the set-top box;
   downloading telephone service programs and data from the service provider's telephone network to the set-top box by the service provider;
   executing the programs downloaded to the set-top box by the user to select a user-chosen telephone service;
   entering data selections made by the user in the set-top box;
   storing the user selections in the set-top box; and
   using the user selections by the set-top box to provide a user-chosen telephone service to the user.

2. The method as in claim 1, wherein the step of storing the user selections in the set-top box comprises the step of:
   storing the user selections in a storage medium removably coupled to the set-top box.

3. The method as in claim 2, further comprising the steps of:
   removing the storage medium from the set-top box; and
   inserting the removed storage medium in a second set-top box, thereby achieving a functionality in the second set-top box similar in nature to the first set-top box.

4. Computer-executable program code stored on a computer-readable medium, said program code configured to provide consumer-chosen telephone services on utilizing a digital cable TV set-top box, the digital cable TV set-top box coupled to a cable network headend with a service provider's telephone network also coupled to the cable network headend, comprising:
   code to scan for an available downstream channel on the cable network;
   code to synchronize the distal cable TV set-top box with the available downstream channel;
   code to synchronize the digital cable TV set-top box with service provider's telephone network through the cable network headend;
   code to download programs and data to the set-top box over the available downstream channel;
   code to enable a user to select a desired telephone service;
   code to enter the user's selections in the set-top box;
   code to store the user's selections in the set-top box; and
   code to use the user's selections to provide the desired telephone service to the user.

* * * * *